Patented May 7, 1946

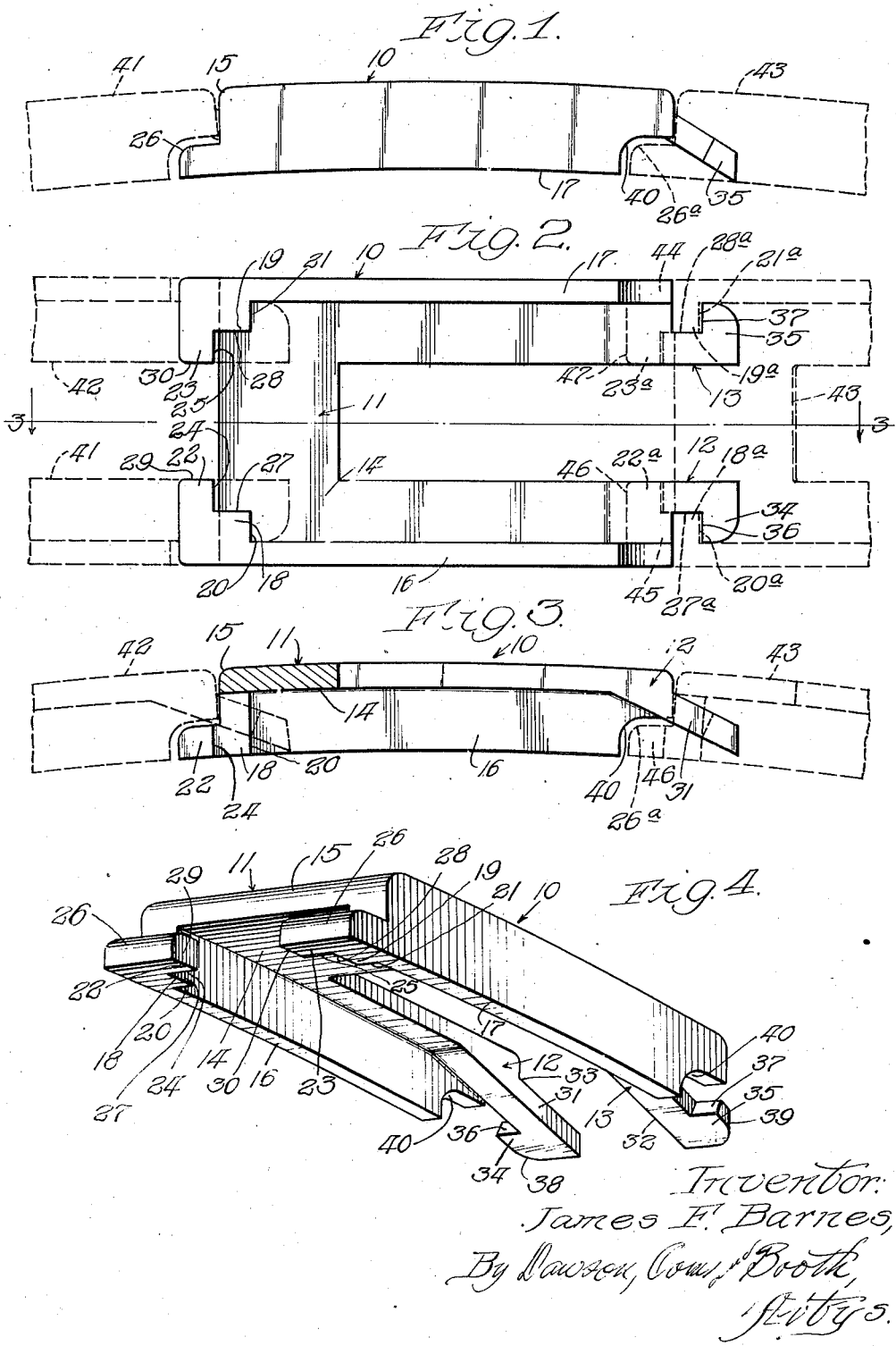

2,399,659

UNITED STATES PATENT OFFICE 2,399,659

BELT LINK

James F. Barnes, Chicago, Ill., assignor to James F. Barnes, trustee

Application August 15, 1941, Serial No. 407,082

5 Claims. (Cl. 59—85)

This invention relates to a belt link and more particularly to a link adapted to be releasably secured to similar links to form a part of an endless belt.

An object of the invention is to provide a belt link which may be made of a resinous material or the like and possesses no overlying or overlapping parts. By reason of the structure being free of overlying and overlapping parts the link may be made by a single molding or pressing operation. Another object is to provide a link having a body portion which is adapted to be releasably secured to the leg portion of an adjacent link and a leg portion adapted to be releasably secured to the adjacent body of another link. Still another object is to provide an endless belt composed of a plurality of identical links, the body of one link being secured to the legs of the next link. Yet another object is to provide a belt in which a plurality of links may be engaged and disengaged from each other at will without turning any of the links at an angle substantially out of the plane of the belt.

Another object of the invention is to provide a link of resilient material equipped with legs which may be sprung or distorted and arranged in interlocking relation with the body portion of another link. A further object is to provide a link structure equipped with parts which are adapted to be interlocked with similar parts in another link and in which a pair of resilient legs are arranged to be sprung towards each other to permit their insertion in the coupling portion of the body of an adjacent link.

Other features and advantages will appear from the following specification and drawing, in which—

Figure 1 is a side elevational view of a link secured at both ends to similar links; Fig. 2 is a bottom view of the link similarly arranged; Fig. 3 is a longitudinal sectional view taken along the line 3—3 of Fig. 2; and Fig. 4 is a perspective view of the link.

In the embodiment of the invention described herein the link 10 is equipped with a body portion 11 and with a leg portion containing a pair of legs 12 and 13. The link 10 is preferably an integral structure which may be made of any suitable material. The material may be a synthetic or natural resin or other plastic or, if desired, it may be metallic or cellulosic in character.

The body portion 11 includes a flat base 14 rounded at one end 15. The sides of the base 14 extend downwardly to form rails 16 and 17. At the end of each of the rails or sides 16 and 17 are lateral projections 18 and 19 extending inwardly towards each other. The projections 18 and 19 form the flanges 20 and 21 which are right-angularly disposed with respect to the rails 16 and 17 respectively.

The projections 18 and 19 are enlarged at the ends thereof to form another pair of projections 22 and 23 which also extend inwardly towards each other. This latter pair of projections 22 and 23 form the right angular flanges 24 and 25. The entire end of each of the rails 16 and 17 from which the projections 18, 19, 22 and 23 are formed is rounded at the upper surface as seen at 26. The projections 18 and 19 provide side walls 27 and 28 respectively while the projections 22 and 23 provide side walls 29 and 30 respectively.

The projections 18 and 19 and projections 22 and 23 provide a coupling means which with the base 14 and rails 16 and 17 of the body portion form a space for releasably receiving the leg of an adjacent link.

The legs 12 and 13 extend from the body portion 11 in spaced parallel relation and are provided with end portions 31 and 32 which are slightly depending with respect to the portion of the leg extending from the body portion 11. The upper surface of each of the legs is provided with a cut away portion 33.

The end portions 31 and 32 of the legs 12 and 13 are equipped with laterally extending outward projections 34 and 35 respectively, the projections 34 and 35 forming right angular flanges 36 and 37 respectively with the side walls of the legs. The projections 34 and 35 are provided with rounded outer surfaces 38 and 39.

The rails 16 and 17 extend along the legs 12 and 13 and are preferably integrally secured thereto. The rails thus provide a flange construction which strengthens the main portion of each of the legs. The ends of the rails are provided with cut away portions 40 which are adapted to receive the rounded projections of the body of the next adjacent link.

As seen in Figs. 1 to 3, the body portion 11 of the link may be secured to the legs 41 and 42 of the next adjacent link. The legs 12 and 13 on the other hand, are secured to the body 43 of another adjacent link.

The legs 12 and 13 of the link are preferably sufficiently resilient to permit them to be sprung or distorted inwardly towards each other and thus inserted in the coupling portion of the body 43 of the next adjacent link. The rails 16 and 17 which are integrally secured to the legs should be of the same material.

When the links are to be assembled to form a belt the legs 12 and 13 are sprung inwardly towards each other by exerting pressure on the outsides of the rails 17 and 16. The end portions 31 and 32, of the legs 12 and 13, carrying the projections 34 and 35 are then inserted between the wings 44 and 45 of the next adjacent link, with the legs 12 and 13 passing over the projections 22a and 23a.

The projections 34 and 35 while the legs 12 and 13 are sprung are passed between the upper portions of the projections 18a and 19a of the body 43 of the next adjacent link. When the legs 12 and 13 have been so inserted, the pressure upon them may be released in order that they may spring outwardly to their normal position. The flanges 36 and 37 will then engage the flanges 20a and 21a of the wings 44 and 45 respectively and thus will prevent longitudinal separation of the two links with respect to each other, the recesses 40 in the legs 12 and 13 receive the rounded portions 25a and 26a of the body 43 of the next adjacent link and prevent longitudinal movement of the links towards each other. The outer sides of the ends 31 and 32 of the legs 12 and 13 will engage the walls 27a and 28a to prevent movement of the links with respect to each other in a horizontal plane. The projections 46 and 47 underlie the legs 12 and 13 and prevent downward movement thereof. Similarly, the pojections 34 and 35 underlie the body portion 43 and engage the same.

The body portion 11 is releasably secured in a similar manner to the legs 41 and 42 of another adjacent link.

When it is desired to disengage any of the links it is necessary only to press inwardly on the rails 16 and 17 to spring the legs 31 and 32 towards each other and then withdraw them from the coupling portion of the body of the next adjacent link as formed by the extending wings thereof.

With this link construction, a structure is provided which is free of overlapping and overlying parts. No portion of the link overlies or overlaps another portion of the same link. In other words, a central longitudinal axis drawn continuously through each of the parts of the link does not at any time turn more than 90° with respect to the portion of the axis passing through the body of the link.

While there are shown and described certain embodiments of the invention, it is understood that it is capable of many modifications. Changes, therefore, in the construction and arrangement of the various parts and in the materials specified may be made without departing from the spirit and scope of the invention as proposed in the appended claims.

I claim:

1. A link adapted to be releasably secured to similar links to form a part of an endless belt comprising, a body portion having a lateral projection vertically spaced therefrom and providing with said body portion a space for receiving the leg of an adjacent link therebetween, said projection being also longitudinally spaced from said body portion, and a leg portion having a lateral projection adapted to underlie the adjacent body of another link, and interlocking means on said body portion and said leg portion for securing the same to the legs and body respectively of adjacent links the entire link being free of overlapping and overlying parts.

2. A link adapted to be releasably secured to similar links to form a part of an endless belt comprising, a body portion equipped with coupling means providing with said body portion a space for releasably receiving the leg of an adjacent link, said body portion being provided with a lateral projection for underlying said leg, a pair of spaced legs integrally formed with said body portion and equipped with means for releasably receiving the adjacent body of another link, said legs being provided with lateral projections for underlying the adjacent body of the link to which the legs are joined, the outer sides of said legs being normally spaced apart by a distance greater than the width of said space and said legs being of a slightly resilient material whereby they may be sprung inwardly for insertion in the body of the adjacent link, and flanges on said body portion and on the legs adapted to engage in interlocking relation the legs and body respectively of adjacent links to prevent longitudinal movement of the links with respect to each other, the entire link being free of overlapping and overlying parts.

3. In an endless belt, a plurality of identical links secured together in interlocking relation, each of the links having a body portion equipped with means for releasably receiving the leg of an adjacent link, said body portion being provided with a lateral projection vertically spaced from said body portion and providing therewith a space for receiving the leg of said adjacent link, and a leg portion integral with said body portion and equipped with means for releasably receiving the adjacent body of another link, said leg portion being provided with a lateral projection for underlying the adjacent body of another link, and flanges on said body portion and said leg portion adapted to engage in interlocking relation the legs and body respectively of adjacent links to prevent longitudinal movement of the links with respect to each other.

4. A link adapted to be releasably secured to identical links to form a part of an endless belt, comprising a body portion equipped with spaced side walls and inwardly-extending spaced lateral projections on said side walls forming a coupling member adapted to be interlocked with the legs of an adjacent link, said projections being vertically and longitudinally spaced from said body portion, and spaced legs of slightly resilient material extending from said body portion and integral therewith, said legs being equipped with substantially-rigid outwardly-extending lateral projections adapted to be interlocked with the coupling member of an adjacent link, the entire link being free of overlying and overlapping parts.

5. A link adapted to be releasably secured to identical links to form a part of an endless belt, comprising a body portion equipped with spaced side walls and inwardly-extending spaced lateral projections, the body portion, side walls and lateral projections forming a coupling member providing a space for releasably receiving the legs of an adjacent link, said projections being adapted to engage in interlocking relation the legs of an adjacent link, and a pair of spaced legs extending from said body portion and integral therewith and equipped with outwardly-extending projections for engaging in interlocking relation the coupling member of another adjacent link, the outer surfaces of said legs being normally spaced apart by a distance slightly greater than the width of the space provided by said coupling member, said legs being of slightly resilient material whereby they may be sprung inwardly for insertion in the space in the coupling member of the adjacent link.

JAMES F. BARNES.